United States Patent
Kim et al.

(10) Patent No.: US 7,138,210 B2
(45) Date of Patent: Nov. 21, 2006

(54) PUNCHED ELECTRODE AND RECHARGEABLE LITHIUM BATTERY USING THE SAME

(75) Inventors: Soo-Ryoung Kim, Taejeon (KR); Jee-Ho Kim, Taejeon (KR); Ho-Kyung Byun, Taejeon (KR); Yong-Rae Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 606 days.

(21) Appl. No.: 10/240,792

(22) PCT Filed: Feb. 4, 2002

(86) PCT No.: PCT/KR02/00158

§ 371 (c)(1),
(2), (4) Date: Oct. 4, 2002

(87) PCT Pub. No.: WO02/063705

PCT Pub. Date: Aug. 15, 2002

(65) Prior Publication Data

US 2003/0099885 A1     May 29, 2003

(30) Foreign Application Priority Data

Feb. 6, 2001  (KR) .................. 2001-5731

(51) Int. Cl.
*H01M 4/58*     (2006.01)
*C25B 11/03*    (2006.01)
*C25B 11/00*    (2006.01)

(52) U.S. Cl. ............... 429/231.95; 204/283; 204/284

(58) Field of Classification Search ............ 429/209, 429/241, 231.95, 231.1; 204/284, 283
See application file for complete search history.

(56) References Cited

U.S. PATENT DOCUMENTS

| | | | |
|---|---|---|---|
| 3,749,606 A * | 7/1973 | Sarbacher | 429/209 |
| 4,743,520 A * | 5/1988 | Rosansky | 429/94 |
| 6,680,141 B1 * | 1/2004 | Hikmet et al. | 429/129 |

FOREIGN PATENT DOCUMENTS

| | | |
|---|---|---|
| JP | 03-53456 A | 3/1991 |
| JP | 3-182059 A | 8/1991 |
| JP | 03-226968 A | 10/1991 |
| JP | 9-283116 A | 10/1997 |
| JP | 2000-58103 A | 2/2000 |
| KR | 1999-23885 U | 7/1999 |
| KR | 1999-58899 A | 7/1999 |
| KR | 100286939 B1 | 1/2001 |

* cited by examiner

*Primary Examiner*—Patrick Joseph Ryan
*Assistant Examiner*—Thomas H. Parsons
(74) *Attorney, Agent, or Firm*—Birch, Stewart, Kolasch & Birch, LLP

(57) ABSTRACT

The present invention relates to a punched electrode and a rechargeable lithium battery using the same, and more particularly to a punched electrode and a rechargeable lithium battery using the same that can improve cycle life, capacity, and safety characteristics of the battery. The present invention can improve cycle life, capacity, and rate characteristics etc. of the battery by making the impregnation rate of an electrolyte higher and by uniformly controlling the impregnation degree, and it can improve safety properties of the battery by preventing lithium deposition such that a uniform electrode reaction occurs, through punching out a hole in an anode, an anode/cathode, or an anode/cathode/separator of an electrode group that comprises the inner part of the lithium secondary battery.

6 Claims, 4 Drawing Sheets

PUNCHED ELECTRODE AND RECHARGEABLE LITHIUM BATTERY USING THE SAME

This application is the national phase under 35 U.S.C. 371 of PCT International Application No. PCT/KR02/00158 which has an International filing date of Feb. 4, 2002, which designated the United States of America.

BACKGROUND OF THE INVENTION (a) Field of the Invention

The present invention relates to a punched electrode and a lithium secondary battery using the same, and more particularly to a punched electrode that can improve cycle life, capacity, and safety characteristics of batteries, and a rechargeable lithium secondary battery using the same.

(b) Description of the Related Art

Recently, an explosive increase in demand for portable electronic equipment has also made the demand for secondary batteries rapidly increase, and in particular, the role of lithium secondary batteries has been very important therein. In addition, as portable electronic equipment has been miniaturized and the efficiency thereof has been heightened, high performance, miniaturization, and various shapes of batteries have been required. Particularly, for personal computers, various shapes of batteries to decrease the thickness of personal computers have been attempted because battery size has a large influence on thickness of a personal computer. In addition, as serious environmental problems have arisen, solutions to global warming have been seriously and continuously discussed.

For a solution to these problems, legislation to decrease use of automotive petroleum fuel, which is a principal cause of global warming, and obligations to use electronic vehicles that are more environmentally friendly have been discussed, and some such directives are currently in force. In addition, in order to solve pollution problems, studies and development of electronic vehicles (HEV, EV) have been continuously carried out, and some such vehicles are commonly used now. For this, batteries having large capacity are required, and a novel approach to thermal stability and safety is also required.

In order to satisfy these needs, an attempt to increase height and width of batteries has been made. Although such an attempt can increase battery capacity and simplify the shape of batteries, it may be an obstacle to battery performance because there are difficulties in uniformly wetting the entire electrode area with electrolyte as the electrode area widens, and in causing a uniform electrode reaction over the entire electrode area during progression through charge and discharge cycles. Therefore, although electrode conditions are fair, a lack of electrolyte may accelerate electrode degeneration and therefore shorten the cycle life of batteries. In addition, if an electrode becomes seriously non-uniform, electrode reactions will be locally concentrated, and local deposition of lithium metal may cause safety problems.

SUMMARY OF THE INVENTION

The present invention is made in consideration of the problems of the prior art, and it is an object of the present invention to provide an electrode for a lithium secondary battery that improves uniformity and cycle life of batteries by making the impregnation of an electrolyte smooth, and by making electrolyte remaining between hole-punch areas uniformly wet over the entire electrode even after many charge/discharge cycles.

It is another object of the present invention to provide a lithium secondary battery comprising the aforementioned electrode.

In order to achieve these objects, the present invention provides an electrode for a lithium secondary battery comprising a cathode, an anode, and a separator film, wherein the cathode is hole-punched.

More particularly, the present invention provides an electrode wherein the cathode is hole-punched, the cathode and the anode are hole-punched, or the cathode, the anode, and the separator film are all hole-punched.

The present invention also provides a lithium secondary battery comprising the aforementioned electrode.

DETAILED DESCRIPTION AND THE PREFERRED EMBODIMENTS

The present invention will now be explained in detail.

The present invention relates to an electrode wherein a cathode, an anode, and a separator film are punched with holes of a specific size, and a rechargeable lithium secondary battery comprising the same. Such a method can increase electrolyte impregnation speed and make impregnation degree uniform to improve battery performance factors such as cycle life, capacity, and rate characteristics, and to prevent lithium deposition to improve battery safety.

Figure 1:
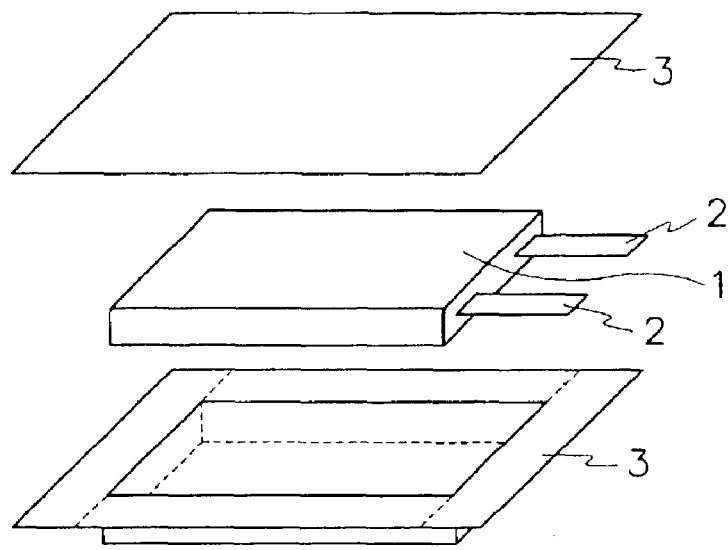
FIG. 1 shows a structure of a rechargeable lithium secondary battery.
Figure 2:
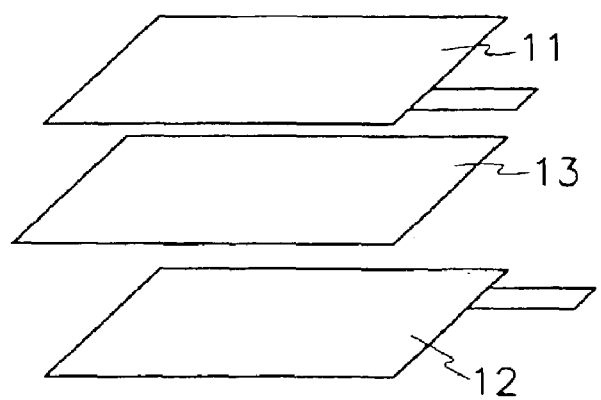
FIG. 2 is a structural diagram of an electrode.

Generally, a rechargeable lithium ion secondary battery comprises an electrode using a lithium cobalt oxide active material for a cathode, carbon active material as an anode, and aluminum-laminated packing paper 3. A structural diagram of a lithium ion battery is shown in FIG. 1 (cathode and anode are shown as identifier 2 in FIG. 1), wherein the electrode 1 has a stacking form (FIG. 2). For a cathode 11, active material is coated on an aluminum foil, and for an anode 12, active material is coated on a copper foil. Therefore, electrolyte cannot be impregnated perpendicularly to an electrode surface, but is entirely impregnated from the edge of an electrode by capillary effects. When the area of an electrode is small, such a structure does not cause significant problems, but when the area is large, it causes difficulties in supply and impregnation of an electrolyte. In addition, in the case of the existing large capacity batteries, as an electrode size becomes larger, a temperature difference occurs in the battery due to the difference in heat transfer, resulting in a negative influence on battery performance.

Accordingly, in order to solve these problems, the present invention punches holes in a cathode, a cathode/ anode, or a cathode/ anode/ separator film (e.g., separator film 13 of FIGS. 2. 3 and 4) with a specific size to thereby facilitate smooth electrolyte supply to improve battery performance.

Figure 3:
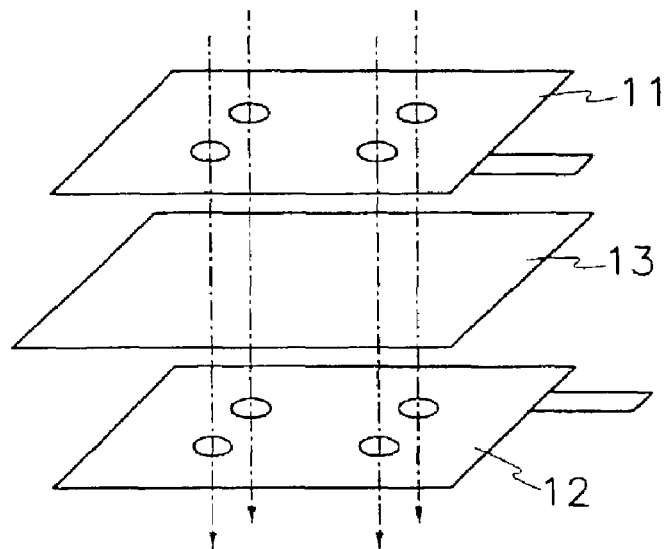
FIG. 3 is a structural diagram of the electrode of Example 2.

Accordingly, in order to solve these problems, the present invention punches holes in a cathode, a cathode/anode, or a cathode/anode/separator film (e.g., separator film 13 of FIGS. 2, 3, and 4) with a specific size to thereby facilitate smooth electrolyte supply to improve battery performance.

Specifically, the present invention punches holes in an electrode, thus enabling electrolyte movement in a direction perpendicular to an electrode surface to increase electrode-wetting speed and to uniformly provide electrolyte throughout the total electrode area, thereby improving battery performance.

According to the present invention, in addition to uniformly supplying electrolyte throughout the total electrode area, surplus electrolyte simultaneously remains in the punched positions. This prevents non-uniform electrolyte distribution during charge/discharge cycles to prevent non-uniform electrode reaction by electrolyte after cycle progression, thereby improving the cycle life of the battery by prevention of early electrode degeneration.

In addition, the punched electrode of the present invention makes heat transfer smoother than in the existing batteries, thereby decreasing the negative influence of temperature to enable uniform reaction throughout the entire electrode area, thus improving battery performance. Electrode preparation is also facilitated by stacking electrodes on the basis of the punched positions.

According to the present invention, cathode punching is conducted under the condition represented by the following Mathematical Formula 1:

$$A-B>B \qquad \text{[Mathematical Formula 1]}$$

wherein A is the total area of the cathode, and B is the area of the punched part of the cathode.

In addition, anode punching is conducted under the condition represented by the following Mathematical Formula 2:

$$C-D>D \qquad \text{[Mathematical Formula 2]}$$

wherein C is the total area of the anode, and D is the area of the punched part of the anode.

Separator film punching is conducted under the condition represented by the following Mathematical Formula 3:

$$E-F>F \qquad \text{[Mathematical Formula 3]}$$

wherein E is the total area of the separator film, and F is the area of the punched part.

In addition, punching of a cathode and an anode, or punching of a cathode, an anode, and a separator film is conducted at the same position for each element. For example, for circular punching, the center of each hole is in the same place.

The present invention provides a rechargeable lithium secondary battery comprising an electrode comprising a cathode punched under the above condition, an anode, and a separator film; a cathode/anode terminal; and an aluminum-laminated packing paper.

The rechargeable lithium secondary battery of the present invention also includes a rechargeable lithium secondary battery comprising an electrode comprising a punched cathode, a punched anode, and a separator film; a cathode/anode terminal; and an aluminum-laminated packing paper.

In addition, the rechargeable lithium secondary battery of the present invention includes a rechargeable lithium secondary battery comprising an electrode comprising a punched cathode, a punched anode, and a punched separator film; a cathode/anode terminal; and an aluminum-laminated packing paper, As explained, the rechargeable lithium secondary battery using the punched electrode according to the present invention has a higher electrolyte impregnation speed and more uniform impregnation than general batteries, and has superior battery capacity.

The present invention will be explained in more detail with reference to the following Examples, but the present invention is not limited to them.

COMPARATIVE EXAMPLE 1

An electrode using lithium cobalt oxide for a cathode and carbon active material for an anode were not punched, and an electrode separated by olefin electrolyte film 13 (FIG. 2) was prepared.

EXAMPLE 1

In a like same cathode and anode to those of Comparative Example 1, holes having the same center at the same position as the central line of a stacked position were punched (FIG. 3), the cathode 11 having a hole with a diameter of 2 mm and the anode 12 having a hole with a diameter of 1 mm. Then, an electrode group was prepared by the same method as in Comparative Example 1.

EXAMPLE 2

In a like same cathode and anode to those of Comparative Example 1, holes having the same center at the same position as the central line of a stacked position were punched (FIG. 3), the cathode having a hole with a diameter of 2 mm and the anode having a hole with a diameter of 1 mm. Then, an electrode group was prepared by the same method as in Comparative Example 1.

EXAMPLE 3

Figure 4:
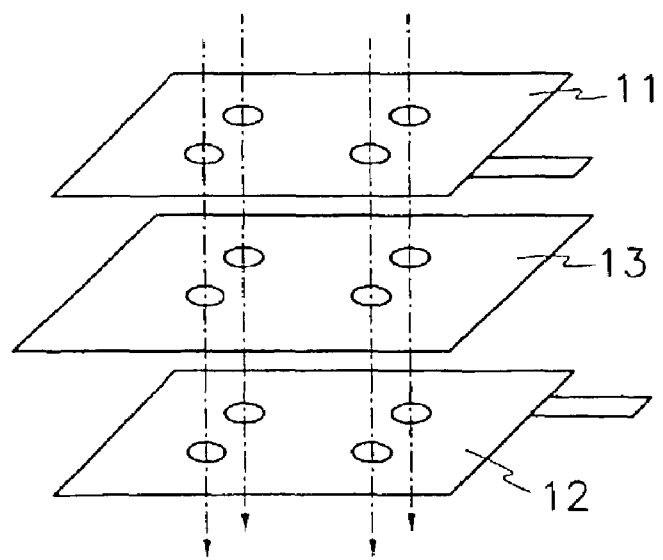
FIG. 4 is a structural diagram of the electrode of Example 3.

An electrode was prepared by the same method as in Example 2, except that in a separator film Ia, a hole with a diameter of 0.5 mm was punched using a laser at the same position at the same center as the holes of the punched electrodes (FIG. 4)

EXAMPLE 4

The electrodes prepared in Comparative Example 1 and Examples 2 and 3 were respectively introduced into aluminum packing paper (FIGS. 1~3); electrolytes comprising ethylenecarbonate (EC), ethylmethylcarbonate (EMC), and lithium salt (LiPF6) were simultaneously injected therein in the same amounts; they were covered with a packing paper; and then the edges were heat sealed to manufacture lithium ion batteries. The manufactured batteries were respectively impregnated for 2 hours, 6 hours, 1 day, 2 days, and 1 week, and then after decomposing the batteries, weights of the electrodes were measured to determine the amount of impregnated electrolyte and they were compared.

Figure 5:
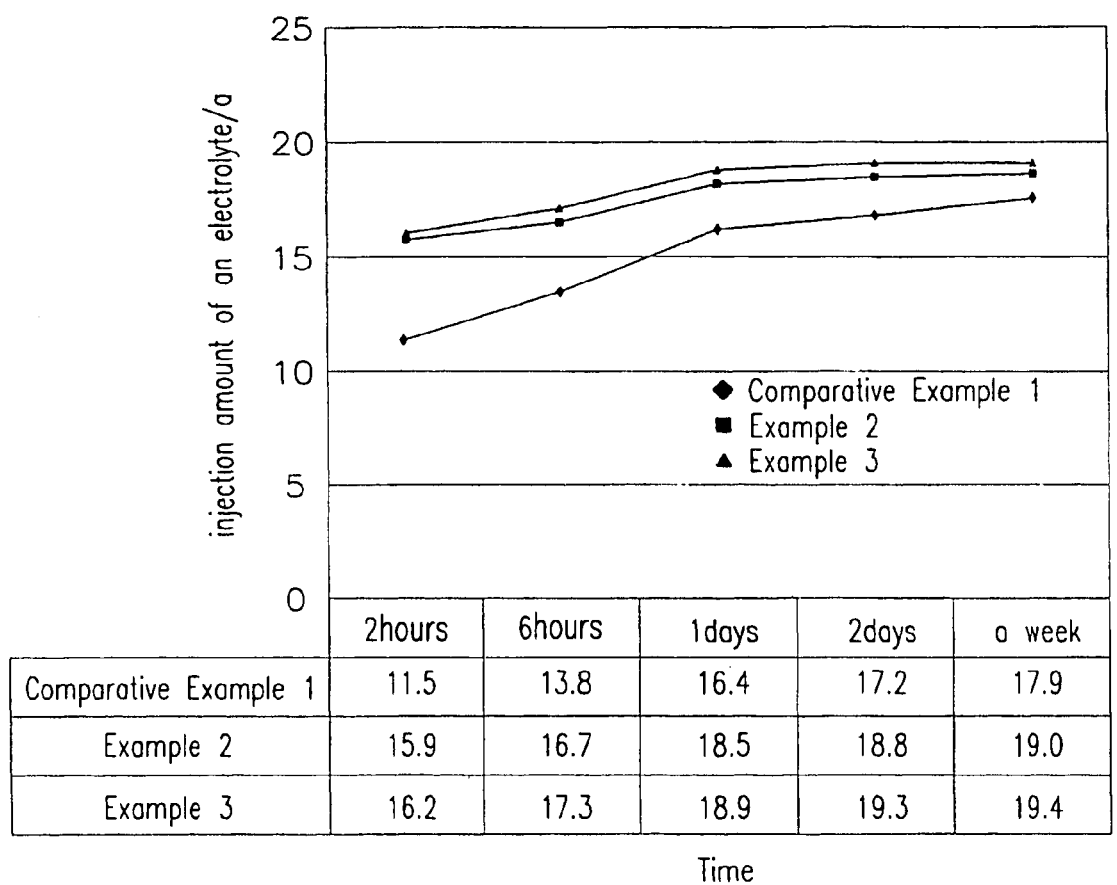
FIG. 5 shows results of comparing electrolyte impregnation speed of a battery to which unpunched electrodes are applied (Comparative Example 1) and those of batteries to which punched electrodes are applied (Examples 2 and 3)

FIG. 5 shows the amount of impregnated electrolyte for each battery according to the lapse of time. It can be seen that the largest amount of electrolyte was impregnated with the highest speed in the battery of Example 3, compared to the batteries using general electrodes (Comparative Example 1). Specifically, as shown in FIG. 5, the amounts of impregnated electrolyte were initially in the order of Example 3, Example 2, and Comparative Example 1, and as time passed, the difference in the amounts decreased. From this, it can be determined that a battery using electrodes wherein a cathode/anode/separator film are all punched has the highest electrolyte impregnation speed. In addition, although a difference in the amount of impregnated electrolytes decreased as time passed, there were still differences in the amount even after 1 week, indicating that electrolyte was most uniformly impregnated in the battery of Example 3.

EXAMPLE 5

Charge/discharge of the rechargeable lithium ion batteries manufactured in Comparative Example 1 and Examples 2 and 3 were conducted under charge/discharge conditions of 0.5 C/1.0 C using a charge, discharge tester, and discharge capacity and AC impedance were measured for each. Then, after repeating charge/discharge cycles, AC impedance was measured again and discharge capacity results according to cycle for each sample were compared.

Figure 6:
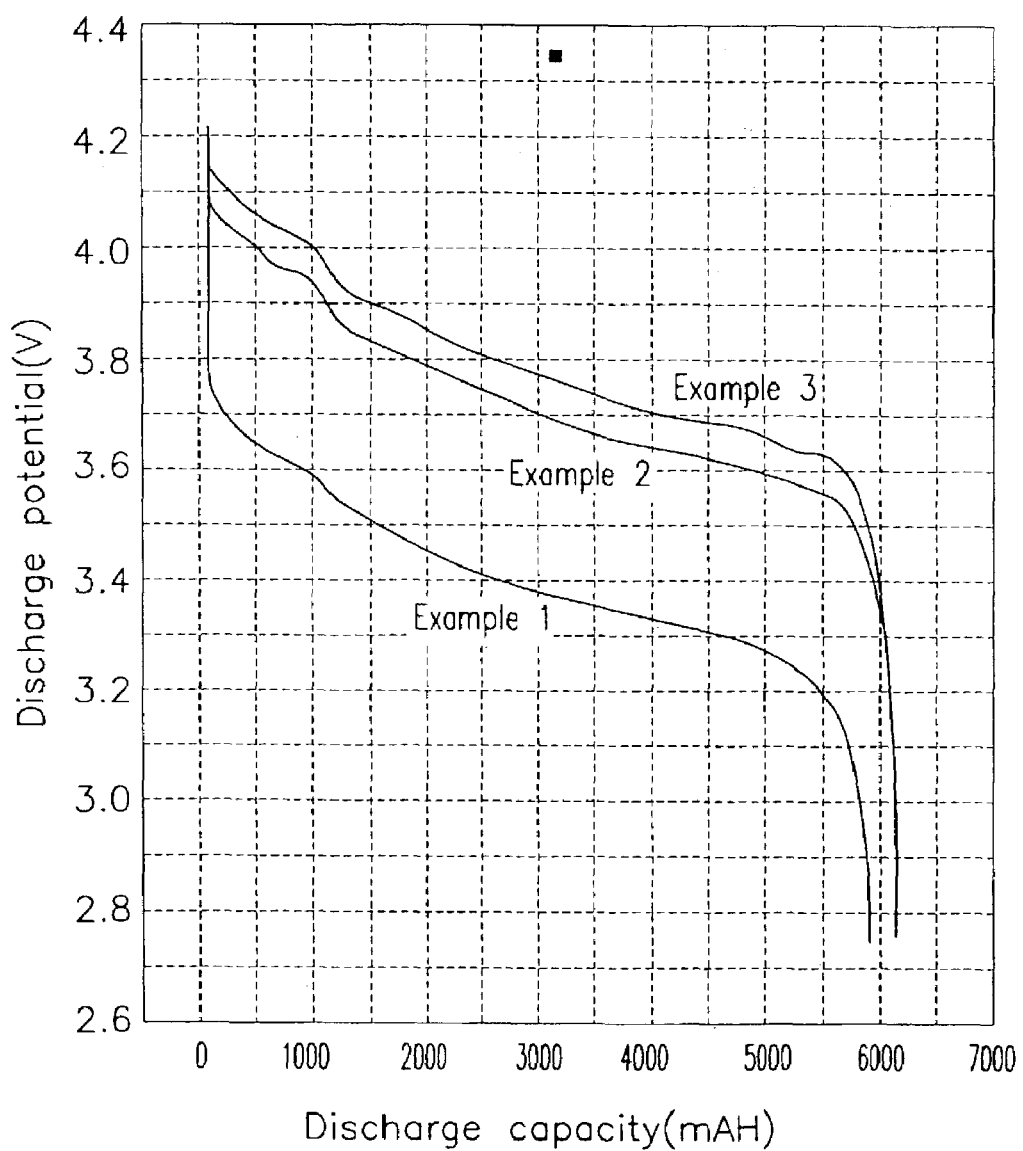
FIG. 6 shows results of comparing the $10^{th}$ cycle discharge curve of the battery to which unpunched electrodes are applied (Comparative Example 1) and those of the batteries to which punched electrodes are applied (Examples 2 and 3).

FIG. 6 is a graph comparing the $10^{th}$ discharge curves of Comparative Example 1 and Examples 2 and 3, charged and discharged under 1C conditions. As shown in FIG. 6, the AC impedance of Comparative Example 1 was larger than those of Examples 2 and 3, which is considered to be due to the fact that the electrolyte-wetting speed for an electrode is slow and thus wetting was not sufficiently conducted throughout the entire electrode. In addition, the result that Comparative Example 1 showed a larger voltage drop than Examples 2 and 3 corresponds to the AC impedance measurement values. From the results that the batteries using punched electrodes (Examples 2 and 3) showed relatively low capacity decrease speeds according to cycle progression than the battery using a general electrode (Comparative Example 1), and differences in discharge capacities were larger under the 1C condition than at 0.5C, it can be identified that wetting of electrode is most non-uniform in Comparative Example 1 and thus the Hi-Rate discharge capacity is small.

According to the present invention, a cathode, a cathode/anode, or a cathode/anode/separator film of an electrode comprising an inner part of a rechargeable lithium secondary battery are hole-punched, thus increasing the electrolyte impregnation speed and making the impregnation degree uniform to improve battery performance factors such as cycle life, capacity, and rate characteristics, and making electrode reactions uniformly conducted thereby preventing lithium deposition to improve battery safety.

What is claimed is:

1. An electrode assembly comprising:
   a cathode,
   an anode, and
   a separator film,
   wherein the cathode, the anode and the separator film are all punched with holes at the same location.

2. The electrode according to claim 1, wherein the cathode is punched with holes under a condition represented by the following Mathematical Formula 1:

$$A-B>B \qquad \text{[Mathematical Formula 1]}$$

wherein A is the total area of the cathode, and B is the area of the punched part of the cathode.

3. The electrode according claim 1, wherein the anode is punched with holes under a condition represented by the following Mathematical Formula 2:

$$C-D>D \qquad \text{[Mathematical Formula 2]}$$

wherein C is the total area of the anode, and D is the area of the punched part of the anode.

4. The electrode according to claim 1, wherein the separator film is punched under a condition represented by the following Mathematical Formula 3:

$$E-F>F \qquad \text{[Mathematical Formula 3]}$$

wherein E is the total area of the separator film, and F is the area of the punched part of the separator film.

5. An electrode comprising
   a cathode,
   an anode, and
   a separator film,
   wherein the cathode, the anode and the separator film are all punched with holes at the same location, and wherein the electrode assembly enables electrolyte movement in a direction perpendicular to the electrode surface.

6. A lithium secondary battery comprising the electrode according to any one of claims 1, 2, 3, 4 and 5.

* * * * *